(12) United States Patent
Min et al.

(10) Patent No.: US 10,091,063 B2
(45) Date of Patent: Oct. 2, 2018

(54) TECHNOLOGIES FOR DIRECTED POWER AND PERFORMANCE MANAGEMENT

(71) Applicant: INTEL CORPORATION, Santa Clara, CA (US)

(72) Inventors: Alexander W. Min, Portland, OR (US); Ira Weiny, Livermore, CA (US); Patrick Connor, Beaverton, OR (US); Jr-Shian Tsai, Portland, OR (US); Tsung-Yuan C. Tai, Portland, OR (US); Brian J. Skerry, Jr., Gilbert, AZ (US); Iosif Gasparakis, Tigard, OR (US); Steven R. Carbonari, Beaverton, OR (US); Daniel J. Dahle, Wilsonville, OR (US); Thomas M. Slaight, Beaverton, OR (US); Nrupal R. Jani, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 576 days.

(21) Appl. No.: 14/583,658

(22) Filed: Dec. 27, 2014

(65) Prior Publication Data

US 2016/0191412 A1 Jun. 30, 2016

(51) Int. Cl.
  *G06F 15/173* (2006.01)
  *H04L 12/24* (2006.01)
  *H04L 12/911* (2013.01)

(52) U.S. Cl.
  CPC ........ *H04L 41/0826* (2013.01); *H04L 41/083* (2013.01); *H04L 47/783* (2013.01)

(58) Field of Classification Search
  CPC .. H04L 47/783; H04L 41/0826; H04L 41/083
  (Continued)

(56) References Cited

U.S. PATENT DOCUMENTS

| | | | |
|---|---|---|---|
| 6,108,782 A * | 8/2000 | Fletcher | G06F 8/65 |
| | | | 370/245 |
| 6,338,078 B1 * | 1/2002 | Chang | H04L 29/06 |
| | | | 712/16 |

(Continued)

FOREIGN PATENT DOCUMENTS

WO   WO 2012114398 A1 *   8/2012   ............. H04L 12/44

*Primary Examiner* — Richard G Keehn
(74) *Attorney, Agent, or Firm* — Barnes & Thornburg LLP

(57) ABSTRACT

Technologies to monitor and manage platform, device, processor and power characteristics throughout a system utilizing a remote entity such as controller node. By remotely monitoring and managing system operation and performance over time, future system performance requirements may be anticipated, allowing system parameters to be adjusted proactively in a more coordinated way. The controller node may monitor, control and predict traffic flows in the system and provide performance modification instructions to any of the computer nodes and a network switch to better optimize performance. The target systems collaborate with the controller node by respectively monitoring internal resources, such as resource availability and performance requirements to provide necessary resources for optimizing operating parameters of the system. The controller node may collect local system information for one or all of the computer nodes to dynamically steer traffic to a specific set of computers for processing to meet desired performance and power requirements.

24 Claims, 6 Drawing Sheets

(58) Field of Classification Search
USPC ....... 709/223, 224, 225, 226, 227, 228, 229, 709/230
See application file for complete search history.

(56) References Cited

U.S. PATENT DOCUMENTS

| | | | | |
|---|---|---|---|---|
| 6,459,682 | B1* | 10/2002 | Ellesson | H04L 41/5003 370/235 |
| 8,321,704 | B2* | 11/2012 | Clarke, Jr. | G06F 9/5072 709/226 |
| 2006/0195698 | A1* | 8/2006 | Pinkerton | H04L 9/3236 713/181 |
| 2010/0241831 | A1* | 9/2010 | Mahadevan | G06F 9/4812 712/42 |
| 2011/0213869 | A1* | 9/2011 | Korsunsky | G06F 21/55 709/223 |
| 2012/0023236 | A1* | 1/2012 | Backholm | H04L 47/20 709/226 |
| 2012/0240185 | A1* | 9/2012 | Kapoor | H04L 63/1425 726/1 |
| 2013/0024710 | A1* | 1/2013 | Jackson | G06F 1/3203 713/323 |
| 2013/0205002 | A1* | 8/2013 | Wang | H04L 69/16 709/224 |
| 2014/0059225 | A1* | 2/2014 | Gasparakis | H04L 29/0818 709/226 |
| 2015/0324306 | A1* | 11/2015 | Chudgar | G06F 13/385 710/308 |

* cited by examiner

TECHNOLOGIES FOR DIRECTED POWER AND PERFORMANCE MANAGEMENT

BACKGROUND

Modern computing devices have become ubiquitous tools for personal, business, and social uses. As such, many modern computing devices are capable of connecting to various data networks, including the Internet and corporate intranets, to retrieve and receive data communications over such networks. Oftentimes, a computing device connected to one network needs to communicate with a computing device connected on a different network. Computing device and network platform power and performance management is an important aspect of maximizing performance for devices and networks. It is often advantageous to monitor device power and performance to determine device parameters (e.g., processor clock speed, memory usage, etc.) and to adjust appropriate parameters as necessary to improve performance and/or conserve power. Similarly, it is advantageous to monitor network performance to adjust network device operation and data routing to improve data communication performance. However, device and network performance have conventionally been performed independently from one another utilizing different algorithms. Such systems have been unable to jointly monitor and manage platform power and performance issues.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
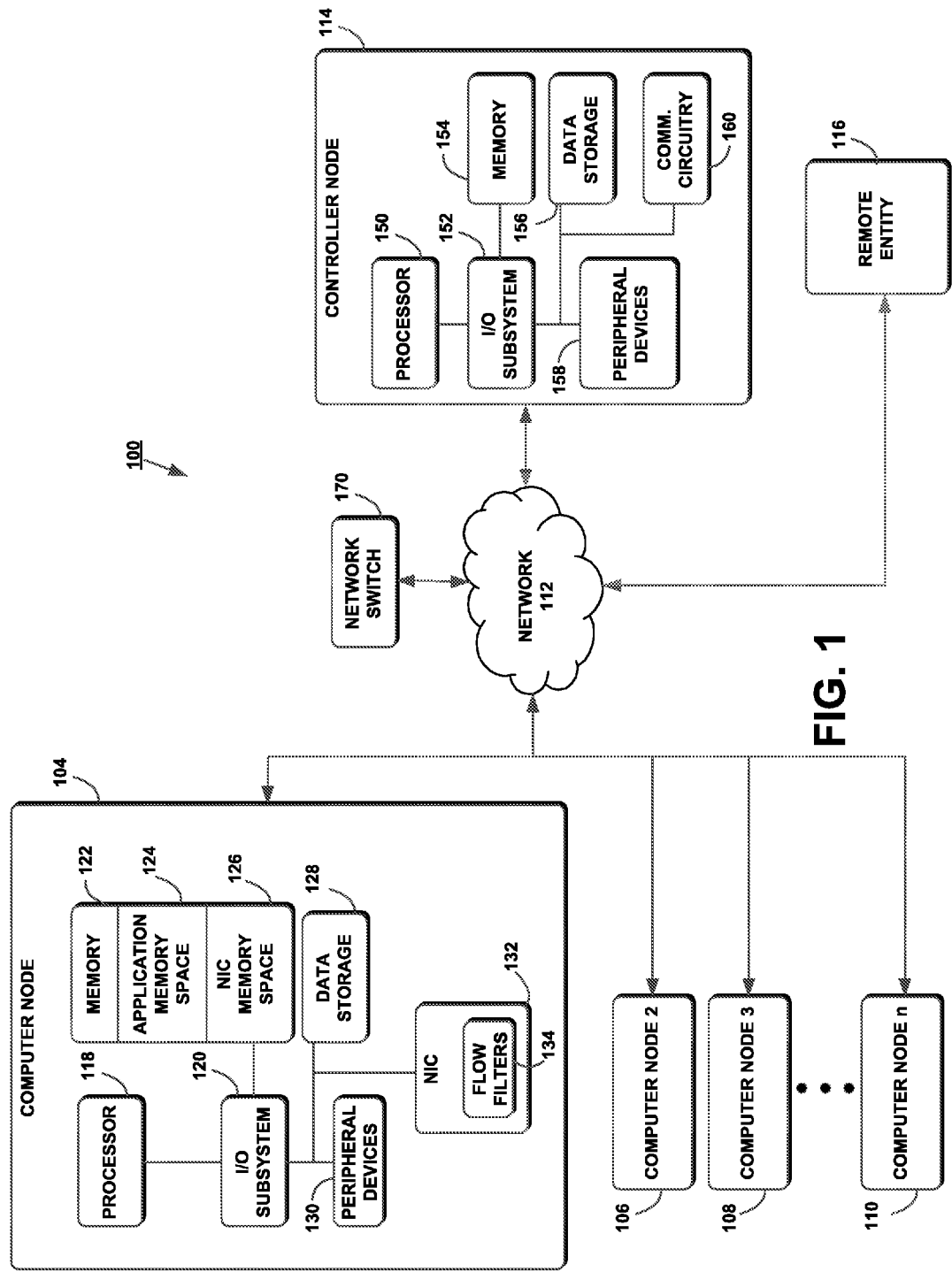
FIG. 1 illustrates a simplified block diagram of at least one embodiment of a system environment configuration illustrating a controller node communication with monitoring and managing a plurality of computer nodes on a network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for OpenFlow-directed power and performance management is shown. The illustrative system 100 includes a computer node 104, a controller node 114, a remote entity 116 and a network switch 170, each of which may be capable of operating in a software-defined networking (SDN) environment. SDN is a networking architecture in which decisions regarding how network traffic is to be processed and the devices or components that actually process the network traffic are decoupled into separate planes (i.e., the control plane and the data plane). In SDN environments, a centralized SDN controller (e.g., controller node 114) is used to make forwarding decisions for network traffic instead of a network device such as, for example, a network switch. Typically, the forwarding decisions are communicated to a network device operating in the SDN environment, which in turn forwards network packets associated with the network traffic to the next destination based on the forwarding decisions made by the SDN controller.

In use, the system 100 operates to monitor and manage platform, device, processor, and power characteristics throughout the system utilizing a remote entity such as controller node 114 and/or remote entity 116. By remotely monitoring and managing system operation and performance, future system performance requirements may be anticipated, allowing system parameters to be adjusted proactively in a more coordinated way. In an embodiment, the controller node 114 and/or the remote entity 116 may monitor, control, and predict traffic flows in the system 100 and provide performance modification instructions to any of the computer nodes 104-110 and the network switch 170 to better optimize performance. The target systems, such as computer nodes 104-110, collaborate with the controller node 114 and/or the remote entity 116 by respectively monitoring internal resources, such as system resource availability, performance requirements (e.g., throughput, latency, etc.) to provide necessary resources for optimizing operating parameters of the system 100. In another embodiment, the controller node 114 and/or the remote entity 116 may collect local system information for one or all of the computer nodes 104-110 to dynamically steer traffic to a specific set of computers for processing to meet desired performance and power requirements. Illustrative local system information may include computer node platform capability, such a number of CPU cores, memory, hardware accelerators and so forth. The computer nodes 104-110 may also provide finer-grained run-time measurement data (e.g., CPU, memory, cache, I/O. etc.) that is processed by the controller node 114 and/or the remote entity 116 to optimally map traffic-to-computer capabilities.

In the embodiment illustrated in FIG. 1, the computer node 104 (as well as computer nodes 106-110) may be embodied as any type of computing device capable of performing the functions described herein. For example, a computer node may be embodied as, but is not limited to, a computer, a desktop computer, a personal computer (PC), a tablet computer, a laptop computer, a notebook computer, a server computer, a mobile computing device, a smart phone, a cellular telephone, a handset, a messaging device, a work station, a network appliance, a web appliance, a distributed computing system, a multiprocessor system, a processor-based system, a consumer electronic device, a digital television device, a set top box, and/or any other computing device configured to store and access data, and to execute electronic cloud software and related applications. Computer nodes 2-n (106-110) are similarly configured to the arrangement illustrated in computer node 104.

In the illustrative embodiment of FIG. 1, the computer node 104 includes processor 118, I/O subsystem 120, memory 122, data storage 128, communication circuitry comprising network interface controller (NIC) 132 and flow filters 134 along with any number of devices and circuitry for enabling communications between computer node 104 and one or more other external electronic devices and/or systems. Processor 118 may be embodied as any type of processor currently known or developed in the future and capable of performing the functions described herein. For example, processor 118 may be embodied as a single or multi-core processor(s), digital signal processor, microcontroller, or other processor or processing/controlling circuit. Similarly, memory 122 may be embodied as any type of volatile or non-volatile memory or data storage currently known or developed in the future and capable of performing the functions described herein. In operation, memory 122 may store various data and software used during operation of computer node 104 such as operating systems, applications, programs, libraries, and drivers. For example, in some embodiments, a portion of the memory 122 (e.g., application memory space 124) may be allocated or otherwise reserved for use by an application being executed by one or more cores of the processor 118. Additionally, in some embodiments, another portion of the memory 122 (e.g., NIC memory space 126) may be allocated or otherwise reserved for the storage of data that is to be sent by the NIC 132 and or data that is received by the NIC 132. In such embodiments, the NIC memory space 126 may include one or more memory queues for storing data (e.g., network packets, etc.) that is to be sent or received in the NIC 132.

Peripheral devices 130 may also include a display, along with associated graphics circuitry and, in some embodiments, may further include a keyboard, a mouse, audio processing circuitry (including, e.g., amplification circuitry and one or more speakers), and/or other input/output devices, interface devices, and/or peripheral devices. In some embodiments, the memory 122 and/or data storage 128 has stored therein one or more application programs, and the processor 118 is operable to execute the one or more application programs and control a display screen to display corresponding graphical information thereon.

Of course, computer node 104 may include other or additional components, such as those commonly found in a digital apparatus and/or computer (e.g., various input/output devices), in other embodiments. Additionally, in some embodiments, one or more of the illustrative components may be incorporated in, or otherwise from a portion of, another component. For example, in some embodiments, a portion of the memory 122 (e.g., application memory space 124) may be allocated or otherwise reserved for use by an application being executed by one or more processor cores of processor 118. Additionally, in some embodiments, another portion of the memory 122 (e.g., NIC memory space 126) may be allocated or otherwise reserved for the storage of data that is to be sent by the NIC 132 and/or data that is received by the NIC 132. In such embodiments, the NIC memory space 126 may include one or more memory queues for storing data (e.g., network packets, etc.) that is to be sent or received via ports of the NIC 132.

In the illustrative embodiment, the memory 122 is communicatively coupled to the processor 118 via one or more communication links (i.e., point-to-point links, bus links, wires, cables, light guides, printed circuit board traces, etc.). The memory 122 may also be communicatively coupled to the processor 118 via the I/O subsystem 120, which may be embodied as circuitry and/or components to facilitate input/output operations with the processor 118, the memory 122, and other components of computer node 104. For example, the I/O subsystem 120 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SoC) and be incorporated, along with processor 118, memory 122, and other components of computer node 104, on a single integrated circuit chip. Peripheral devices 130 may include any number of additional input/output devices, interface devices, and/or other peripheral devices.

The NIC 132 of the computer node 104 may be embodied as any type of communication circuit, device, or collection thereof, capable of enabling communications between the computer node 104 and other computing devices via one or more communication networks (e.g., local area networks, personal area networks, wide area networks, cellular networks, a global network such as the Internet, etc.). The NIC 132 may be configured to use any one or more communication technologies (e.g., wireless or wired communications) and associated protocols (e.g., Ethernet, Wi-Fi®, WiMAX, etc.) to effect such communication. The NIC 132 may include or otherwise communicatively coupled to a port or communication interface. The port may be configured to communicatively couple the controller node 114 to any number of other computing devices and/or networks (e.g., physical or logical networks). For example, the port communicatively couples the NIC 132 of the computer node 104 to the network switch 170, which may be communicatively coupled to the remote computing device 180, the controller node 114, and/or any number of other computing devices or networks.

In the illustrative embodiment, the NIC 132 is communicatively coupled to processor 118 via one or more communication links (i.e., point-to-point links, bus links, wires, cables, light guides, printed circuit board traces, etc.). For example, in some embodiments, the NIC 132 is embodied as a Peripheral Component Interconnect Express (PCIe) device communicatively coupled to the processor 118 via a PCIe I/O bus of the computer node 104. Of course, it should be appreciated that the NIC 132 may be embodied as any other type of communication device communicatively coupled to the processor 118 of the computer node 104.

In some embodiments, the NIC 132 may also include one or more flow filters 134. The one or more flow filters 134 may be programmed in the NIC 132 by the computer node 104 based at least in part on, or otherwise as a function of, network flow information received from a controller node 114 and/or remote entity 116. In some embodiments, the flow filters 134 may specify a particular memory queue in the NIC memory space 126 assigned to or otherwise allocated for storage of network packets that are received by the NIC 132 and/or network packets that are to be transmitted by the NIC 132. Additionally, in some embodiments, the flow filters 134 specify a particular memory queue in the NIC memory space 126 allocated for storage of network packets that are transmitted or received by a particular port of the NIC 132. Additionally or alternatively, in some embodiments, the NIC 132 (or a driver or the NIC 132) may pre-allocate or pre-assign a memory queue in the NIC memory space 126 for each port included within the NIC 132. That is, each port of the NIC 132 may be allocated or otherwise assigned a specific memory queue in the NIC memory space 126 prior to the computer node 104 programming the flow filters 134 in the NIC 132.

For example, in some embodiments, the NIC 132 and/or an associated driver may modify and/or pre-allocate one or more memory queues in the NIC memory space 126 of the computer node 104 during initialization. In that way, the memory queues for each port included within the NIC 132 are allocated within the same node as the NIC 132. It should be appreciated that, in some embodiments, the network memory queues may be configured to operate as bidirectional memory queues (i.e., transmission and reception) or unidirectional memory queues (i.e., transmission or reception).

In some embodiments, the system 100 may include remote entity controller node 114 and remote entity 116, where each may be configured to store and/or execute the one or more application programs, and in such embodiments the computer nodes 104-110 may operate as thin-client devices. It should be understood by those skilled in the art that the term "remote entity" as used herein may refer to functions and features of technologies disclosed herein performed by the controller node 114, the remote entity 116 or a combination thereof. In other illustrative embodiments, one or more additional remote entities may be used to accommodate the needs and size of the system 100. The controller node 114 and the remote entity 116 may be embodied as SDN servers, or similar computing device capable of performing the functions described herein. In the illustrative embodiment of FIG. 1, the controller node 114 includes a processor 150, an I/O subsystem 152, a memory 154, data storage 156, communication circuitry 160, and one or more peripheral devices 158. Components of controller node 114 may be similar to the corresponding components of the computer node 104, the description of which is applicable to the corresponding components of the controller node 114 and is not repeated herein for clarity of the description.

Communication circuitry 160 of the controller node 114 may include any number of devices and circuitry for enabling communications between the controller node 114 and the computer node 104. In some embodiments, the controller node 114 may also include one or more peripheral devices 158. Such peripheral devices 158 may include any number of additional input/output devices, interface devices, and/or other peripheral devices commonly associated with a server or computing device. The remote entity 116 may be configured in a similar manner as the controller node 114.

In the illustrated embodiment, communication between computer nodes 104-110 and the controller node 114 takes place via network 112 that may be operatively coupled to one or more network switches 170. In one embodiment, network 112 may represent a wired and/or wireless network and may be or include, for example, a local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). Generally, the NIC 132 of the computer node 104 and the communication circuitry 160 of controller node 114 may be configured to use any one or more, or combination, of communication protocols to communicate with each other such as, for example, a wired network communication protocol (e.g., TCP/IP), a wireless network communication protocol (e.g., Wi-Fi®, WiMAX), a cellular communication protocol (e.g., Wideband Code Division Multiple Access (W-CDMA)), and/or other communication protocols. As such, the network 112 may include any number of additional devices, such as additional computers, routers, and switches, to facilitate communications between computer node 104 and controller node 114.

In use, the network switch 170 may receive a network packet from any of the computer nodes 104-110, the controller node 114, and/or the remote entity 116. In some embodiments, the network packet may be targeted or otherwise directed to an application being executed by a processor (e.g., processor 118) of one of the computer nodes 104-110. In such embodiments, the network switch 170 requests forwarding information for the received network packet from the controller node 114, which, as will be discussed in greater detail below, includes resource information associated with the computer node 104 and/or the SDN environment (e.g., topology data, configuration data, layout data, and/or any other type of data describing hardware or software components of the computer node 104 and/or a network). In some embodiments, the controller node 114 also receives and processes information indicative of what applications are being executed within which computer nodes 104-110. Using the resource information, the controller node 114 determines and/or generates network flow information corresponding to the received network packet. The network flow information may identify or otherwise be indicative of the particular computer node 104-110 executing the application targeted by the received network packet. In some embodiments, the network flow information may also identify or otherwise be indicative of the network adapter of the particular computer node (104-110) to which the received network packet should be forwarded.

After determining the network flow information, the controller node 114 transmits the network flow information to the computer device which programs or otherwise configures a flow filter 134 in the identified network adapter (e.g., the NIC 132). In some embodiments, the flow filter 134 may be configured to copy network packets associated with a network flow (e.g., the received network packet and any subsequent network packets) to a particular network memory queue allocated to the identified network adapter (e.g., the NIC 132). In some embodiments, the network memory queues may be configured to operate as either bidirectional or unidirectional memory queues.

After the flow filter 134 has been programmed by the computer node 104, the controller node 114 determines forwarding information for the received network packet based on the flow information. The forwarding information may identify or otherwise be indicative of the network adapter (e.g., the NIC 132) of the particular computer node 104 to which the received network packet should be forwarded. In some embodiments, the forwarding information may include information indicative of a particular interface or port of the network switch 170 communicatively coupled to the identified network adapter (e.g., the NIC 132). The controller node 114 may transmit the forwarding information to the network switch 170, which may utilize the forwarding information to forward the received network packet to the particular port of the network switch 170 communicatively coupled to the identified network adapter (e.g., the NIC 132). It should be appreciated that by maintaining resource information associated with the computer node 104 and/or the SDN environment, the controller node 114 may align a network flow to a particular computer node 104 executing a particular application. In that way, processing of network packets associated with a particular network flow and execution of the application targeted by that flow may occur within the same computer node 104, which is a more efficient use of memory resources and available network bandwidth, lowers network and/or processing latency, enables less power to be consumed by the computer node 104, and enables less processing resources to be utilized to process network packets.

For example, processing network packets of a network flow within the same computer node 104 as the one that the targeted application is being executed is more efficient than processing network packets of a network flow in one computer node 104 and transmitting (e.g., forwarding, sending, etc.) those packets to a different computer node (106-110) within which the targeted application is executing via one or more communication links, (e.g., QuickPath Interconnects (QPI), point-to-point links, bus links, wires, cables, light guides, printed circuit board traces, etc.). Transmitting network packets between computer nodes 104-110 in such a manner may potentially impact the latency, jitter, and throughput of the computer device. This may especially be true in cases in which there are a large number of new and/or existing network flows or network packets that need to be processed in a different computer node than the one in which the targeted application is executing.

Figure 2:
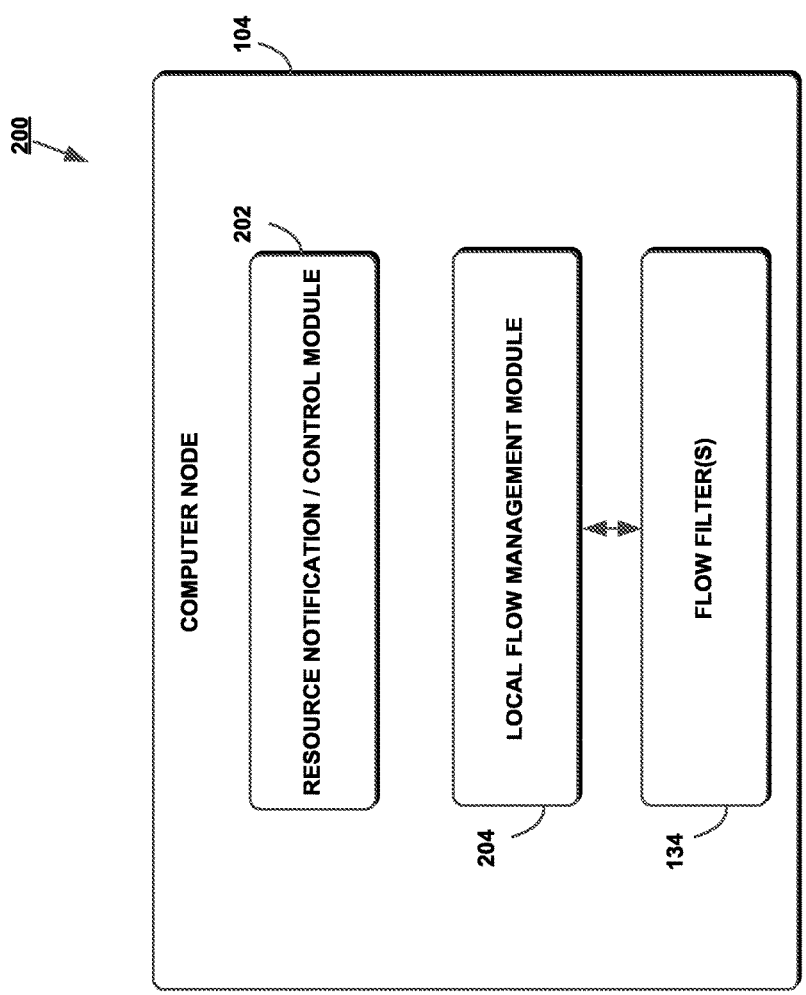
FIG. 2 illustrates a simplified block diagram of at least one embodiment of an environment of a computer node for resource notification, control, and flow management of the system FIG. 1.

Referring now to FIG. 2, in use, the computer node 104 establishes an environment 200 during operation. The illustrative environment 200 includes a resource notification and control module 202, a local flow management module 204, and one or more flow filters 134. Each of the modules, logic, and other components of the environment 200 may be embodied as hardware, software, firmware, or a combination thereof. For example, each of the modules, logic and other components of the environment 200 may form a portion of, or otherwise be established by the processor 118, the NIC 132, and/or other hardware components of the computer node 104. The resource notification and control module 202 may be configured to transmit computer node resource (architectural) information to the controller node 114. The resource information defines an architecture of each computer node 104. In some embodiments, the resource information transmitted by the resource notification and control module 202 includes application data indicative of the applications executed by computer node 104, processor core data indicative of the processor cores of the processor 118, memory queue data indicative of allocated memory queues and/or port data indicative of the ports of the NIC 132 of each of the computer nodes 104-110.

In some embodiments, the resource notification and control module 202 may be configured to transmit the architectural information to the controller node 114 upon initialization of the computer node 104 or a component thereof. In some embodiments, the resource notification and control module 202 may be configured to transmit the architectural information to the controller node 114 as one or more representational state transfer (REST) messages. Of course, it should be appreciated that any other suitable messaging protocol and/or format (e.g., XML-based protocols and/or formats such as Simple Object Access Protocol (SOAP), open standards-based protocols and/or formats such as JavaScript Object Notation (JSON), etc.) may be used by the resource notification and control module 202 to transmit the architectural information to the controller node 114.

The local flow management module 204 of FIG. 2 may be configured to receive network flow information from the controller node 114. The network flow information received from the controller node 114 may be associated with a network packet transmitted by any of computer nodes 104-110 and received by the network switch 170. The network flow information may identify a target computer node (e.g., the computer node 104) to process the network packet based on an application executed by the target computer node. In some embodiments, the network flow information may also identify the target computer node (e.g., the computer node 104) to process the network packet based on an application executed by a particular processor core of the target computer node. It should be appreciated that in some embodiments, the local flow management module 204 may be embodied as a flow director module of the computer node 104 and/or a network adapter (e.g., NIC 132).

In some embodiments, the local flow management module 204 may also be configured to program one or more flow filters 134 in the network adapter (e.g., the NIC 132) based on network flow information received from the controller node 114. The one or more flow filters (e.g., the flow filter 134) may specify a memory queue in the memory (e.g., the memory 122) to receive the network packet (and subsequent related network packets) from the network switch 170. In some embodiments, the one or more flow filters (e.g., the flow filter 134) programmed by the local flow management module 204 may be used by the network adapter (e.g., the NIC 132) to copy the network packet received from the network switch 170 to the specified memory queue in the memory (e.g., the memory 122).

Figure 3:
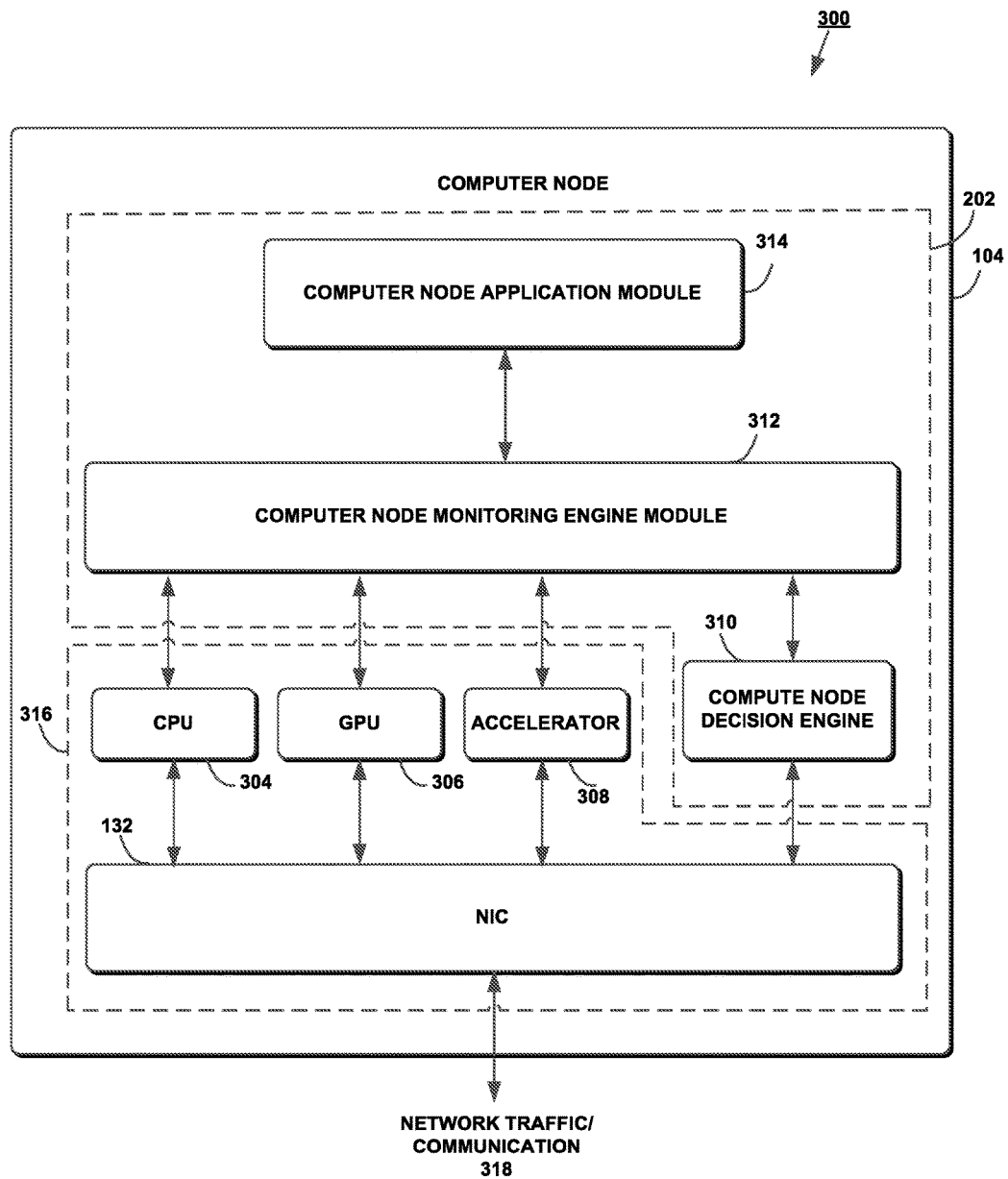
FIG. 3 illustrates another simplified block diagram of at least one embodiment of an environment of a computer node for resource notification, control, and flow management of the system FIG. 1.

Referring now to FIG. 3, in use, the computer node 104 further establishes an environment 300 during operation. The illustrative environment 300 includes a configuration for interfacing a resource notification and control portion 202 (i.e., resource notification and control module 202) and a hardware resource portion 316. The hardware resource portion includes a NIC 132 that transmits/receives network traffic 318, a CPU 304, a graphics processing unit (GPU) 306 and a hardware accelerator 308. Of course, additional hardware components known in the art may be utilized for hardware resource portion 316 to perform functions disclosed herein, and the omission of such additional components in the present disclosure is not intended to be limiting to the specific disclosure in FIG. 3. The CPU 304 frequency may be determined at run-time based on a recent history of average CPU utilization (e.g., using an on-demand CPU governor). However, CPU frequency may not be the primary cause of performance bottlenecks depending on workload characteristics (e.g., compute- or memory-bound), which may result in wasted system energy if the CPU is the only component/device targeted for performance adjustment. By taking into consideration the performance of other components/devices (e.g., the GPU 306, the hardware accelerator 308, the computer node application module 314, etc.) the actual or expected cause of a bottleneck is determined prior to making performance adjustments.

The resource notification and control portion 202 comprises a computer node application module 314, a computer node monitoring engine module 312 and a computer node decision engine module 301, which may communicate hardware platform and traffic information to a controller node 114 (discussed in greater detail below in connection with FIG. 4) via the NIC 132. The computer node application module 314 may be configured to provide performance requirements for applications on the computer node 104 to the computer node monitoring engine module 312, which may be embodiment in a computer node 104 operating system (OS) or embedded in hardware. The computer node monitoring engine module 312 further collects platform and/or operational data from hardware including the CPU 304, the GPU 306 and the hardware accelerator 308 and forwards the data from the hardware and the computer node application module 314 to the computer node decision engine 310. The computer node decision engine 310 takes this information and NIC 132 information (platform information) and forwards it via the NIC 132 to the controller node 114 for processing to determine an optimal performance optimization adjustment for the computer node 104 vis-à-vis the system 100.

For example, the NIC 132 may be configured to direct incoming packet flow to a particular device, such as GPU 306, for a specific application and/or task (e.g., deep packet inspection). After platform information is provided to controller node 114 for resource notification and control portion 202 and the hardware resource portion 316, computer node decision engine 310 may receive a performance modification/optimization adjustment signal from controller node 114 causing the NIC 132 to place incoming packets from the flow directed to GPU 306 to the GPU's 306 cache so as to minimize the packet I/O overhead and avoid additional data copies to and from the CPU 304 memory. Once a targeted device is identified, NIC 132 may receive and/or create a flow table entry for use in directing following packets from the same flow.

Under the embodiment of FIG. 3, it can be appreciated that the monitoring and managing of computer node device resources from a remote entity such as controller node 114 allows for greater optimization and control over computer node resources such as the CPU 304, the GPU 306, and hardware accelerators 308, particularly in a network platform utilizing SDN and/or Network Functions Virtualization (NFV) (e.g., deep packet inspection, firewall, etc.). The technologies described in present disclosure also allows the NIC 132 to dynamically and adaptively direct incoming packet flows to local platform devices, processors, accelerators, etc. based on their computing capability, resource availability, energy efficiency, etc. The packet flow functions of the NIC 132 may also be directed inputs from a local user and/or application, as well as inputs (e.g., policies) received from the controller node 114.

As the controller node 114 may have a global view of the entire system, the controller node 114 may provide performance modification instructions to any of the computer nodes 104-110 to modify local hardware platform operations. Additionally, as the controller node 114 monitors network flow characteristics and computer node 104-110 platform capabilities, controller node 114 may proactively adjust system parameters based on learning methods from previous traffic patterns to minimize overhead and optimize resource usages in substantially real time. For example, controller node 114 may perform a dynamic analysis of traffic patterns to identify and block traffic confirmed as unwanted (e.g., virus, spam, etc.) at network ingress. In another example, once controller node 114 has detailed platform information (e.g., available system resources, etc.) and performance requirements (e.g., throughput, latency), the controller node 114 may decide the best candidate computer node 104-110 and/or computer node device (e.g., the NIC 132, the CPU 304, the GPU 306, the hardware accelerator 308, etc.) for packet processing and provide a performance modification instruction to the computer node platform or NIC to directly forward packets to the target computer device. For example, incoming flows that require compression/decompression may be modified to be directed to the hardware accelerator 308, while flows requiring deep packet inspection may be modified to be directed to the GPU 306.

Figure 4:
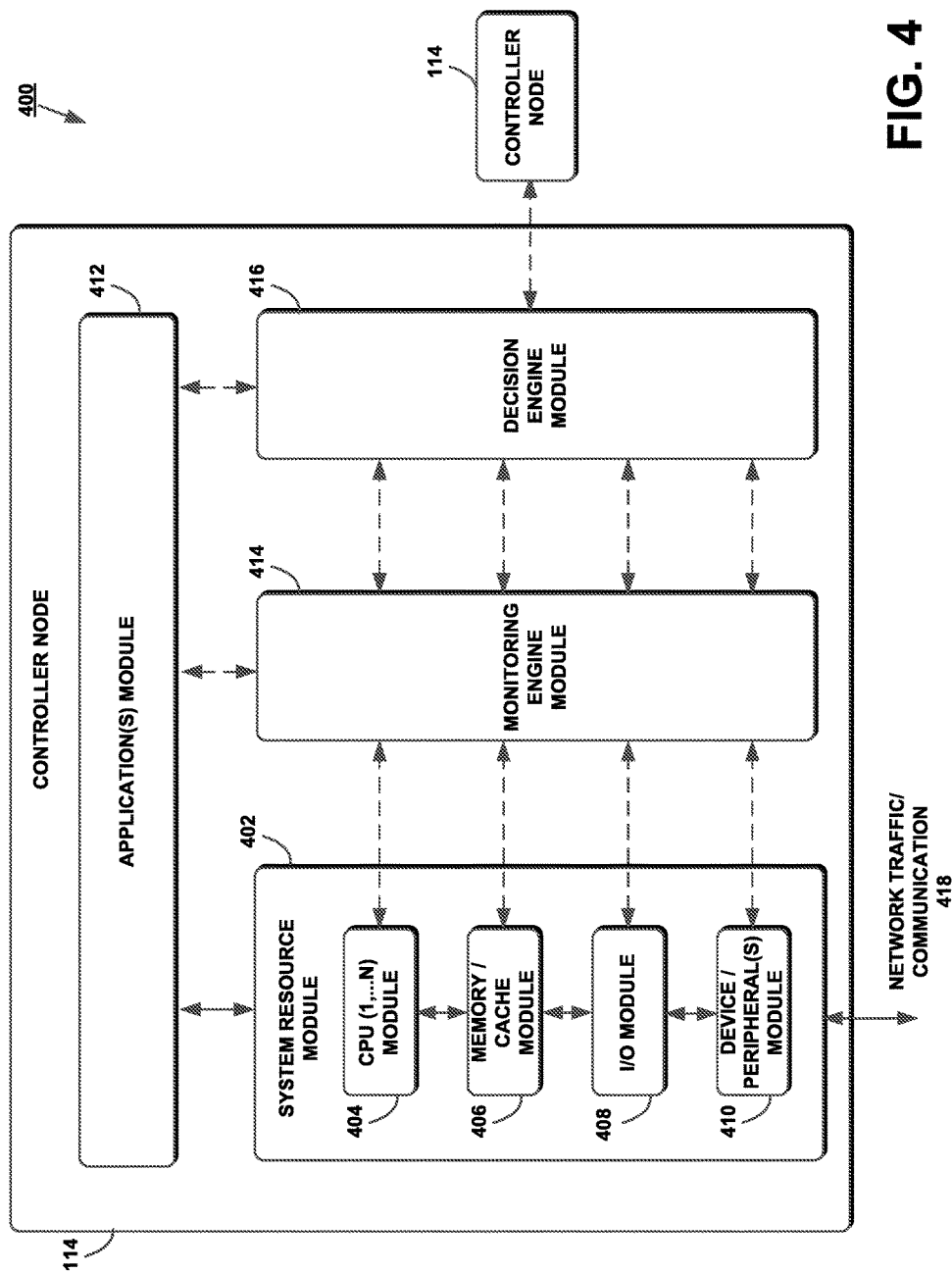
FIG. 4 illustrates a simplified block diagram of at least one embodiment of an environment of a controller node of the system of FIG. 1 for managing and controlling computer node and network resource management.

Referring now to FIG. 4, in use, the controller node 114 establishes an environment 400 during operation. The illustrative environment 400 includes a system resource module 402 coupled to monitoring engine 414, wherein the system resource module is configured to receive/transmit network traffic and communication data 418. System resource module 402 comprises a CPU module 404 for receiving CPU data received from a computer node (104-110), where the CPU data comprises CPU performance data such as CPU frequency, number of cores (1, . . . N), etc. System resource module 402 also comprises a memory/cache module 406 for receiving memory and cache utilization data from each computer node 104-110, an I/O module 408 for receiving I/O data relating to I/O performance on each computer node 104-110, and a device/peripheral(s) module 410 that receives data relating to the existence of and performance capabilities of one or more devices and peripherals of each respective computer node 104-110. Of course, the system resource module 402 may include additional or other resource modules for receiving resource information from the computer nodes 104-110 in other embodiments.

Environment 400 of FIG. 4 further comprises a monitoring engine module 414 that processes and measures the resource utilization, power usage and performance of system components (e.g., CPU, memory, I/O, etc.) based on inputs provided by the system resource module 402 and/or the applicants module 412 which may provide performance requirements for one or more applications for the computer nodes 104-110. In addition, the monitoring engine module may receive monitored traffic flows and traffic characteristics (e.g., traffic volume, packet size, protocol, etc.) produced internally and/or received from the remote entity 116. Using current and/or historical resource, application and/or traffic measurements provided by the monitoring engine module 414 as inputs, the decision engine module 416 processes an optimal system parameter to maximize performance while minimizing the platform power consumption and resource usage. Once optimized, the decision engine module 416 may generate one or more performance modification instructions for transmission to one or more respective computer nodes 104-110, where, as discussed above, when the performance modification instructions are received and processed, the respective computer nodes modify their operating parameters.

As a non-limiting example, an incoming flow may require deep packet inspection at a line rate processing (e.g., 10 Gbps) with a specified latency requirement. As such, the decision engine module 416 can calculate, among other things, (a) an optimal packet batch size for one or more NICs, (b) a number of CPU cores to use, (c) appropriate CPU core frequencies, and (d) memory/cache allocation. If the flows require multiple servers for performance, the controller node 114 can redirect the flows to a set of servers to ensure the requisite performance. In another non-limiting example, if there are multiple incoming flows with different characteristics, the decision engine module 416 can adjust system configurations and/or parameters to separate incoming flows and send them from a NIC (e.g., the NIC 132) to different power control unit (PCU) cores running at different frequencies. As can be appreciated by those skilled in the art, controller node 114 may adapt system parameters proactively based on previous traffic and/or performance, instead of being completely reactive based on changes in resource system usage. For example, if a controller node 114 detects and/or predicts based on prior usage patterns an increase in traffic volume, it may inform one or more destination platforms to prepare for the increase in advance to maximize performance.

Figure 5:
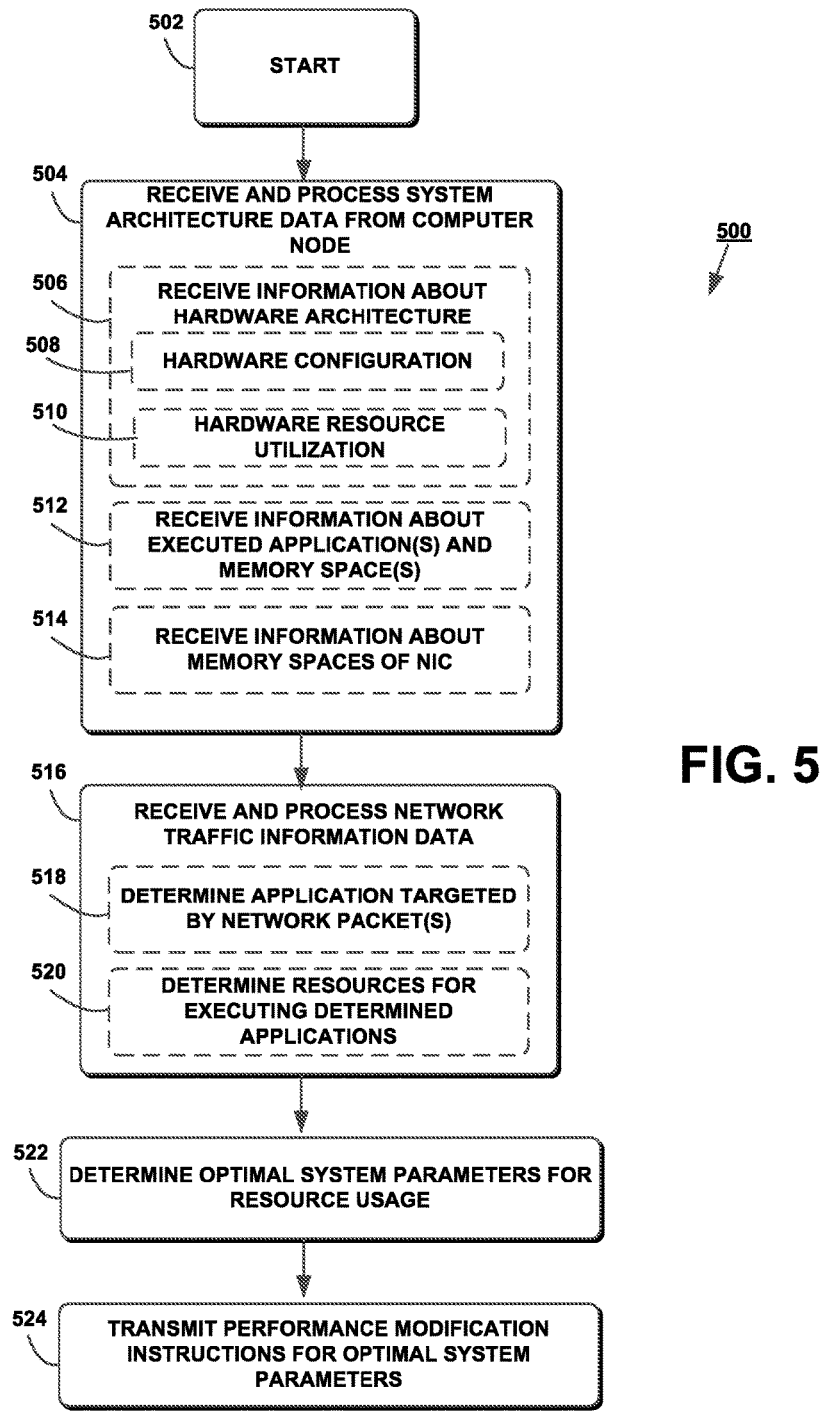
FIG. 5 is a simplified flow diagram of at least one embodiment of a method for receiving and processing system resource data and network traffic data at a controller node and determining optimal system parameters for use in the embodiments of FIGS. 1-4.

Referring now to FIG. 5, the controller node 114 may execute a method 500 for optimizing system parameters and aligning network flows to processing resources of any of the computer nodes 104-110. The method 500 begins with block 504 in which the controller node 114 receives system architecture data and information from the computer node 104. In some embodiments, in block 506, the controller node 114 receives and processes hardware architecture information data from a computer node (104-11) including hardware configuration data in block 508 indicative of which processors and memory banks are included within which computer nodes 104-110, and which processor cores are included in which processors at specific nodes. In some embodiments, architecture data may also include hardware resource utilization data in block 510 indicative of an amount or level of utilization for devices and or components in the computer node (e.g., memory usage, speed of processor, etc.). Additionally, in block 512, the controller node 114 receives resource information from the computer node 104 indicative of which applications are being executed by which computer node 104. In some embodiments, such resource information may also identify which processor cores of the processors are executing which applications. Additionally or alternatively, the received architectural information may include information identifying the memory spaces (e.g., the application memory space 124) assigned to or otherwise allocated to each application being executed. In some embodiments, in block 514, the controller node 114 may also receive resource information from the computer node 104 indicative of which memory queues are assigned to or otherwise allocated to which ports of which network adapter (e.g., the NIC 132). Of course, it should be appreciated that the controller node 114 may receive any other type of resource/architectural information from the computer node 104 in other embodiments.

In block 516, the controller node 114 determines network flow information associated with the network packet received by the network switch 170. The network flow information identifies or is otherwise indicative of a target computer node 104 to process the network packet based at least in part on, or otherwise as a function of, an application executed by the target computer node. In operation, the controller node 114 determines the network flow information based on the resource information received from the computer node 104 and maintained in a computing device architecture database in memory 154. As such, in some embodiments, the controller node 114 in block 518 may determine or otherwise identify the particular application targeted by the network packet received by the network switch 170. To do so, the controller node 114 may examine header information (e.g., a port number and type from a 5-tuple) associated with the network packet to determine the targeted application. Of course, it should be appreciated that the controller node 114 may use any other process for determining or identifying the particular application targeted by the network packet received by the network switch 170. In such embodiments, the controller node 114 may compare the determined application to the resource information received from the computer node 104 to determine the network flow information. Additionally, in some embodiments, the controller node 114 in block 520 may also determine the particular processor core of a processor (e.g., 118) executing the application targeted by the network packet. In such embodiments, controller node 114 may determine that the particular computer node 104 including the processor core executing the application targeted by the received network packet is the target computer node.

In block 522, based on the processed information determined in blocks 504 and 516, the controller node 114 determines optimal system parameters for controller node resource usage and transmits performance modification instructions for optimal system parameters in block 524. The performance modification instructions may comprise instructions for modifying CPU operation, GPU operation and hardware accelerator operation as discussed above. Additionally, performance modification instructions may also include network flow information to the computer node 104. The network flow information may then be used by the computer node 104 to program a flow filter (e.g., the flow filter 134) in the network adapter (e.g., the NIC 132) of the particular target executing the application targeted by the network packet. In some embodiments, the flow filter (e.g., the flow filter 134) in the network adapter (e.g., the NIC 132) of the particular target computing node 104 specifies a memory queue in the memory (e.g., the memory 122) of the target computer node 104 to receive the network packet (and subsequent related network packets) received by the network switch 170.

Moreover, performance modification instructions may include forwarding information associated with the network packet received by the network switch 170. The forwarding information identifies a particular port of the network switch 170 to which the received network packet should be forwarded. In operation, the controller node 114 determines the forwarding information based on the architecture information received from the computer node 104 and maintained in the computing device resource data/architecture and/or the connection information received from the network switch 170. For example, in some embodiments, the controller node 114 may utilize the resource data/information and the connection information to determine that the network adapter (e.g., the NIC 132) of the target computing node executing the application targeted by the network packet is communicatively coupled to a particular port of the network switch 170. The network controller transmits the forwarding information to the network switch 170. The forwarding information may then be used by network switch 170 to forward the received network packet to the particular port communicatively coupled to the network adapter (e.g., the NIC 132) of the target computer node executing the application targeted by the received network packet.

Figure 6:
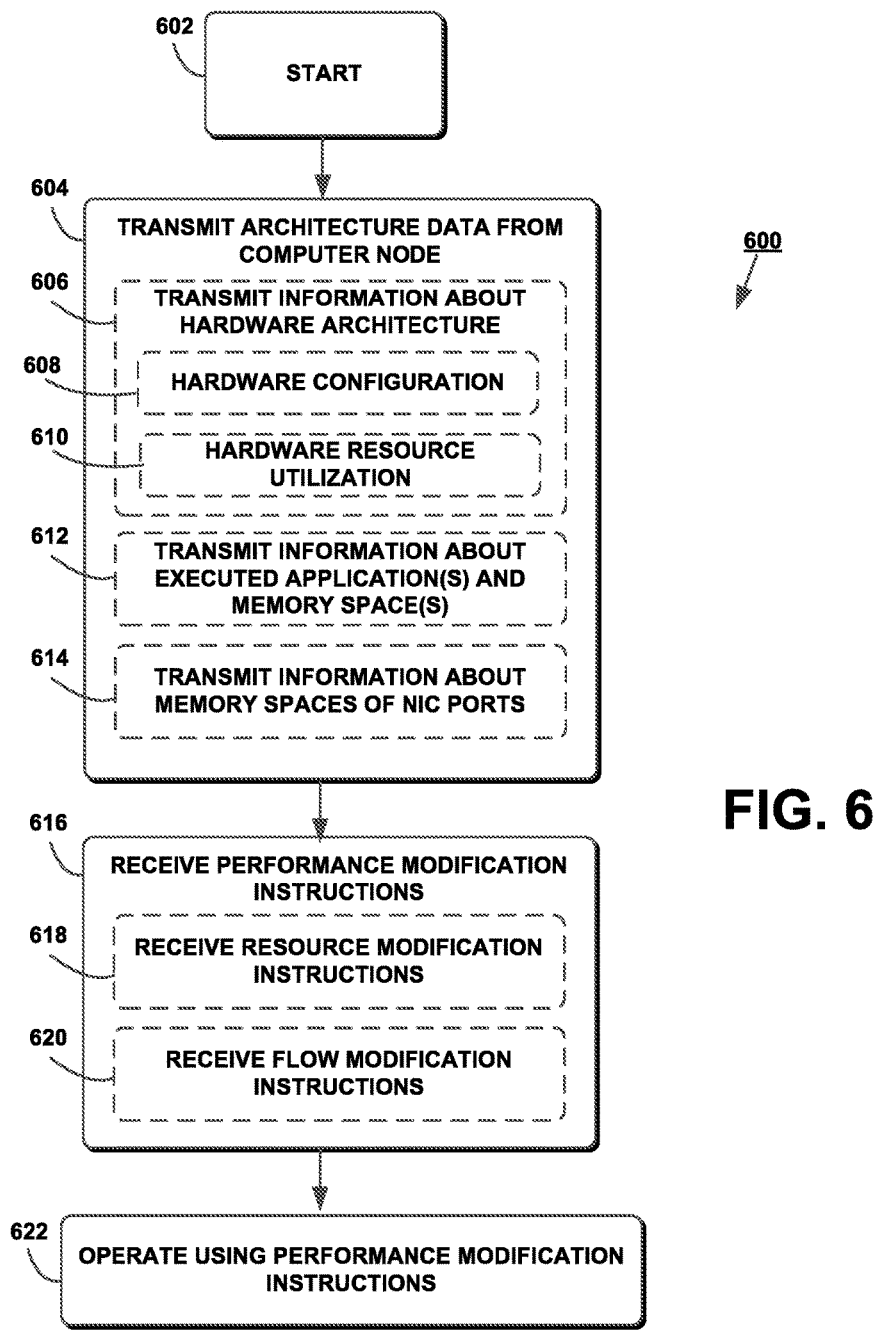
FIG. 6 is a simplified flow diagram of at least one embodiment of a method for transmitting system resource data from a computer node and receiving performance modification instructions for use in the embodiments of FIGS. 1-4.

Referring now to FIG. 6, the computer node 104 may execute a method 600 for optimizing operation of processing resources and flows of the computer node 104. The method 600 begins 602 with block 604 in which the computer node 104 transmits architecture data and information to the controller node 114. In some embodiments, in block 606, the computer node 104 transmits hardware architectural information to the controller node 114 including hardware configuration data in block 608 indicative of which processors and memory banks are included within the computer node, and which processor cores are included in which processors, along with data relating to presence of and/or performance capabilities of GPU(s), hardware accelerators and the like. In some embodiments, architecture data may also include hardware resource utilization data in block 610 indicative of an amount or level of utilization for devices and or components in the computer node (e.g., memory usage, speed of processor, etc.). Additionally, in block 612, the computer node 104 transmits resource/architectural information to the controller node 114 indicative of which applications are being executed by computer node 104. In some embodiments, such resource/architectural information may also identify which processor cores of the processors are executing which applications. Additionally or alternatively, the transmitted resource/architectural information may include information identifying the memory spaces assigned or otherwise allocated to each application being executed. In some embodiments, in block 614, the computer node 104 may also transmit information to the controller node 114 indicative of which memory queues are assigned or otherwise allocated to which ports of which network adapter (e.g., NIC). Of course it should be appreciated that the computer node 104 may transmit any other type of resource/architectural information to the controller node 114 in other embodiments.

In block 616, the computer node 104 receives performance modification instructions that are configured to adjust hardware operational parameters (e.g., adjust PCU speed) in response thereto in block 618. In addition, the performance modification instructions for computer node 104 include flow modification instructions in block 620. The network flow information of flow modification instructions identifies or is otherwise indicative of a target of the computer node 104 to process a network packet based at least in part on, or otherwise as a function of, an application executed by the computer node 104. In some embodiments, the network flow information may also identify or otherwise be indicative of a particular processor core (e.g., 118) executing an application targeted by the network packet. The flow modification instructions of block 620 may be configured to program a flow filter (e.g., the flow filter 134) in the network adapter (e.g., the NIC 132) of the target executing the application targeted by the network packet. In some embodiments, the flow modification instructions of block 620 may be configured to program the flow filter (e.g., the flow filter 134) in the network adapter (e.g., the NIC 132) to specify a memory queue in the memory (e.g., the memory 122) to receive the network packet (and subsequent related network packets) received by the network switch 170.

EXAMPLES

Illustrative examples of the technologies disclosed herein are provided below. An embodiment of the technologies may include any one or more, and any combination of, the examples described below.

Example 1 includes a computing device to optimize processing resources for the computing device over a network, the computing device comprising a resource notification and control module to transmit computing device architectural information to a controller node coupled to the network, the architectural information defining at least one of (i) hardware configuration or (ii) hardware resource utilization of the computing device, wherein the computing device is to receive a performance modification instruction in response to transmission of the architectural information; a local flow management module to program a flow filter in a network adapter of the computing device based on network flow information included in the performance modification instruction, wherein the resource notification and control module is further to modify a hardware operating parameter of the computing device based on the received performance modification instruction.

Example 2 includes the subject matter of example 1, and wherein the architectural information comprises data relating to hardware comprising at least one of a processor, a memory, a graphics processing unit (GPU), a hardware accelerator and a network adapter.

Example 3 includes the subject matter of any of Examples 1 and 2, and wherein the resource notification and control module comprises a monitoring engine module to monitor hardware operating parameters for inclusion in the architectural information of the computing device.

Example 4 includes any of the subject matter of Examples 1-3, and wherein the resource notification and control module comprises an application module to provide performance requirements for applications and monitor applications executed on the computing device for inclusion in the architectural information.

Example 5 includes any of the subject matter of Examples 1-4, and wherein the performance requirements for applications comprises at least one of throughput or latency.

Example 6 includes any of the subject matter of Examples 1-5, and wherein the resource notification and control module comprises a decision engine module to process the performance modification instruction and modify the hardware operating parameter based on the performance modification instruction.

Example 7 includes any of the subject matter of Examples 1-6, and wherein the network flow information is associated with a network packet and identifies target hardware of the computing device to process the network packet based at least on an application executed by the computing device.

Example 8 includes any of the subject matter of Examples 1-7, and wherein the network flow information specifies a memory queue in the memory to receive the network packet.

Example 9 includes any of the subject matter of Examples 1-8, and wherein the network comprises a software-defined networking (SDN) network.

Example 10 includes a controller node to optimize processing resources for one or more computing devices over a network, the controller node comprising a system resource module to collect computing device architectural information from each of the one or more computing devices, the architectural information defining at least one of (i) hardware configuration or (ii) hardware resource utilization of each computing device; a monitoring engine module to process the received architectural information to determine system parameters of components of each computing device; and a decision engine module to generate, based on the determined system parameters, one or more performance modification instructions for at least one of the one or more computing devices, wherein the performance modification instructions includes flow information to program a flow filter in a network adapter.

Example 11 includes any of the subject matter of Example 10, and wherein architectural information comprises data relating to hardware comprising at least one of a processor, a memory, a graphics processing unit (GPU), a hardware accelerator, or the network adapter.

Example 12 includes any of the subject matter of Examples 10 and 11, and wherein the system parameters includes at least one of current and/or historically-based resource utilization, power usage, or performance.

Example 13 includes any of the subject matter of Examples 10-12, and wherein the performance modification instruction includes data to modify a hardware operating parameter of the computing device.

Example 14 includes any of the subject matter of Examples 10-13, and wherein the hardware operating parameter comprises at least one of (i) a packet batch size for the network adapter, (ii) a number of processor cores to use, (ii) processor core frequency, (iii) memory allocation, and (iv) cache allocation.

Example 15 includes any of the subject matter of Examples 10-14, and further comprising an application module to receive performance requirements for applications and monitor applications executed on the computing device from the architectural information.

Example 16 includes any of the subject matter of Examples 10-15, and wherein the performance requirements for application comprise at least one of throughput or latency.

Example 17 includes any of the subject matter of Examples 10-16, and wherein the flow information is associated with a network packet and identifies target hardware of the computing device to process the network packet based on an application executed by the computing device.

Example 18 includes any of the subject matter of Examples 10-17, and wherein the flow information specifies a memory queue in the memory to receive the network packet.

Example 19 includes any of the subject matter of Examples 10-18, and wherein the network comprises a software-defined networking (SDN) network.

Example 20 includes a method to optimize processing resources for a computing device over a network, comprising transmitting, by a resource notification and control module, computing device architectural information to a controller node coupled to the network, wherein the architectural information defines at least one of (i) hardware configuration or (ii) hardware resource utilization of the computing device; receiving, by a network adapter, a performance modification instruction in response to transmitting the architectural information; programming, by a local flow management module, a flow filter in the network adapter based on network flow information included in the received performance modification instruction; and modifying, by the resource notification and control module, a hardware operating parameter of the computing device based on the received performance modification instruction.

Example 21 includes any of the subject matter of Example 20, and wherein transmitting the architecture information comprises transmitting data relating to at least one of a processor, a memory, a graphics processing unit (GPU), a hardware accelerator and the network adapter.

Example 22 includes any of the subject matter of Examples 20 and 21, and further comprising monitoring, by a monitoring engine module of the resource notification and control module, hardware operating parameters for inclusion in the architectural information of the computing device.

Example 23 includes any of the subject matter of Examples 20-22, and further comprising providing, by an application module of the resource notification and control module, performance requirements for applications and monitoring applications executed on the computing device for inclusion in the architectural information.

Example 24 includes any of the subject matter of Examples 20-23, and wherein providing performance requirements for applications comprises providing at least one of throughput or latency requirements.

Example 25 includes any of the subject matter of Examples 20-24, and further comprising processing, by a decision engine module of the resource notification and control module, the performance modification instruction and modifying the hardware operating parameter based on the performance modification instruction.

Example 26 includes any of the subject matter of Examples 20-25, and wherein the network flow information is associated with a network packet and identifies target hardware of the computing device to process the network packet based at least on an application executed by the computing device.

Example 27 includes any of the subject matter of Examples 20-26, and wherein the network flow information specifies a memory queue in the memory to receive the network packet.

Example 28 includes any of the subject matter of Examples 20-27, and wherein the network comprises a software-defined networking (SDN) network.

Example 29 includes a method to optimize processing resources for one or more computing devices over a network using a controlled node, comprising collecting, by a system resource module, computing device architectural information from each of the one or more computing devices, wherein the architectural information defines at least one of (i) hardware configuration or (ii) hardware resource utilization of each computing device; processing, by a monitoring engine module, the received architectural information to determine system parameters for each of the one or more computing devices; generating, by a decision engine module and based on the determined system parameters, one or more performance modification instructions for at least one of the one or more computing devices, the performance modification instructions comprising flow information to program a flow filter in a network adapter.

Example 30 includes the subject matter of Example 29, and wherein collecting computing device architectural information comprises collecting data relating to hardware comprising at least one of a processor, a memory, a graphics processing unit (GPU), a hardware accelerator, or the network adapter.

Example 31 includes any of the subject matter of Examples 29 and 30, and wherein determining system parameters comprises parameters relating to at least one of resource utilization, power usage, or performance.

Example 32 includes any of the subject matter of Examples 29-30, and wherein generating the performance modification instruction comprises generating data to modify a hardware operating parameter of the computing device.

Example 33 includes any of the subject matter of Examples 29-31, and wherein generating data to modify a hardware operating parameter comprises generating data to modify at least one of (i) a packet batch size for the network adapter, (ii) a number of processor cores to use, (ii) processor core frequency (iii) memory allocation and (iv) cache allocation.

Example 34 includes any of the subject matter of Examples 29-32, and further comprising receiving, by an application module, performance requirements for applications and applications executed on the computing device from the architectural information.

Example 35 includes any of the subject matter of Examples 29-33, and wherein the performance requirements for applications comprises at least one of throughput or latency.

Example 36 includes any of the subject matter of Examples 29-34, and further comprising associating the flow information with a network packet that identifies target hardware of the computing device to process the network packet based on an application executed by the computing device.

Example 37 includes any of the subject matter of Examples 29-35, and wherein the flow information specifies a memory queue in the memory to receive the network packet.

Example 38 includes any of the subject matter of Examples 29-36, and wherein the network comprises a software-defined networking (SDN) network.

Example 39 includes one or more machine-readable media comprising a plurality of instructions stored thereon that, in response to execution by a computing device, causes the computing device to perform the method of any of Examples 20-37.

Example 40 includes a computing device for updating firmware of a networking device of the computing device, the computing device comprising means for performing the method of any of Examples 20-37.

Example 40 includes a computing device to optimize processing resources for the computing device over a network. The computing device includes means for transmitting computing device architectural information to a controller node coupled to the network, wherein the architectural information defines at least one of (i) hardware configuration or (ii) hardware resource utilization of the computing device; means for receiving a performance modification instruction in response to transmitting the architectural information; means for programming a flow filter in the network adapter based on network flow information included in the received performance modification instruction; and means for modifying a hardware operating parameter of the computing device based on the received performance modification instruction.

Example 41 includes the subject matter of Example 40, and wherein the means for transmitting the architecture information comprises means for transmitting data relating to at least one of a processor, a memory, a graphics processing unit (GPU), a hardware accelerator and the network adapter.

Example 42 includes the subject matter of Example 40 and 41, and further includes means for monitoring hardware operating parameters for inclusion in the architectural information of the computing device.

Example 43 includes the subject matter of any of Examples 40-42, and further includes means for providing performance requirements for applications and monitoring applications executed on the computing device for inclusion in the architectural information.

Example 44 includes the subject matter of any of Examples 40-43, and wherein the means for providing performance requirements for applications comprises means for providing at least one of throughput or latency requirements.

Example 45 includes the subject matter of any of Examples 40-44, and further includes means for processing the performance modification instruction and modifying the hardware operating parameter based on the performance modification instruction.

Example 46 includes the subject matter of any of Examples 40-45, and wherein the network flow information is associated with a network packet and identifies target hardware of the computing device to process the network packet based at least on an application executed by the computing device.

Example 47 includes the subject matter of any of Examples 40-46, and wherein the network flow information specifies a memory queue in the memory to receive the network packet.

Example 48 includes the subject matter of any of Examples 40-47, and wherein the network comprises a software-defined networking (SDN) network.

Example 49 includes a controller node to optimize processing resources for one or more computing devices over a network. The controller node includes means for collecting computing device architectural information from each of the one or more computing devices, wherein the architectural information defines at least one of (i) hardware configuration or (ii) hardware resource utilization of each computing device; means for processing the received architectural information to determine system parameters for each of the one or more computing devices; means for generating, based on the determined system parameters, one or more performance modification instructions for at least one of the one or more computing devices, the performance modification instructions comprising flow information to program a flow filter in a network adapter.

Example 50 includes the subject matter of Example 49, and wherein the means for collecting computing device architectural information comprises means for collecting data relating to hardware comprising at least one of a processor, a memory, a graphics processing unit (GPU), a hardware accelerator, or the network adapter.

Example 51 includes the subject matter of any of Examples 49 or 50, and wherein the means for determining system parameters comprises means for determining parameters relating to at least one of resource utilization, power usage, or performance.

Example 52 includes the subject matter of any of Examples 49-51, and wherein the means for generating the performance modification instruction comprises means for generating data to modify a hardware operating parameter of the computing device.

Example 53 includes the subject matter of any of Examples 49-52, and wherein the means for generating data to modify a hardware operating parameter comprises means for generating data to modify at least one of (i) a packet batch size for the network adapter, (ii) a number of processor cores to use, (ii) processor core frequency (iii) memory allocation and (iv) cache allocation.

Example 54 includes the subject matter of any of Examples 49-53, and further includes means for receiving performance requirements for applications and applications executed on the computing device from the architectural information.

Example 55 includes the subject matter of any of Examples 49-54, and wherein the performance requirements for application comprises at least one of throughput or latency.

Example 56 includes the subject matter of any of Examples 49-55, and further includes means for associating the flow information with a network packet that identifies target hardware of the computing device to process the network packet based on an application executed by the computing device.

Example 56 includes the subject matter of any of Examples 49-56, and wherein the flow information specifies a memory queue in the memory to receive the network packet.

Example 57 includes the subject matter of any of Examples 49-57, and wherein the network comprises a software-defined networking (SDN) network.

The invention claimed is:

1. A computing device to optimize processing resources for the computing device over a software-defined networking (SDN) network, the computing device comprising:
   one or more processors;
   a memory having a plurality of instructions stored thereon that, when executed by the one or more processors, causes the computing device to:
   transmit computing device architectural information to a controller node coupled to the network, the architectural information defining at least one of (i) hardware configuration or (ii) hardware resource utilization of the computing device,
   receive, in response to transmission of the architectural information, a performance modification instruction from the controller node, wherein the performance modification instruction includes network flow information and modification of one or more hardware operating parameters of the computing device;
   program a flow filter in a network adapter of the computing device based on the network flow information included in the performance modification instruction, and
   modify the one or more hardware operating parameters of the computing device based on the received performance modification instruction.

2. The computing device of claim 1, wherein the architectural information comprises data relating to hardware comprising at least one of a processor, a memory, a graphics processing unit (GPU), a hardware accelerator and a network adapter.

3. The computing device of claim 1, wherein the plurality of instructions, when executed, further cause the computing device to monitor hardware operating parameters for inclusion in the architectural information of the computing device.

4. The computing device of claim 3, wherein the plurality of instructions, when executed, further cause the computing device to provide performance requirements for applications and monitor applications executed on the computing device for inclusion in the architectural information.

5. The computing device of claim 4, wherein the performance requirements for applications comprises at least one of throughput or latency.

6. The computing device of claim 4, wherein the plurality of instructions, when executed, further cause the computing device to process the performance modification instruction and modify the hardware operating parameter based on the performance modification instruction.

7. The computing device of claim 1, wherein the network flow information is associated with a network packet and identifies target hardware of the computing device to process the network packet based at least on an application executed by the computing device.

8. The computing device of claim 7, wherein the network flow information specifies a memory queue in the memory to receive the network packet.

9. A controller node to optimize processing resources for one or more computing devices over a network, the controller node comprising:
   one or more processors;
   a memory having a plurality of instructions stored thereon that, when executed by the one or more processors, causes the computing device to:
   collect computing device architectural information from each of the one or more computing devices, the architectural information defining at least one of (i) hardware configuration or (ii) hardware resource utilization of each computing device;
   process the received architectural information to determine system parameters of components of each computing device; and
   generate, based on the determined system parameters, one or more performance modification instructions for at least one of the one or more computing devices, wherein the performance modification instructions includes flow information to program a flow filter in a network adapter.

10. The controller node of claim 9, wherein architectural information comprises data relating to hardware comprising at least one of a processor, a memory, a graphics processing unit (GPU), a hardware accelerator, or the network adapter.

11. The controller node of claim 9, wherein the system parameters includes at least one of current and/or historically-based resource utilization, power usage, or performance.

12. The controller node of claim 9, wherein the performance modification instruction includes data to modify a hardware operating parameter of the computing device.

13. The controller node of claim 12, wherein the hardware operating parameter comprises at least one of (i) a packet batch size for the network adapter, (ii) a number of processor cores to use, (ii) processor core frequency, (iii) memory allocation, and (iv) cache allocation.

14. The controller node of claim 9, wherein the plurality of instructions, when executed, further cause the computing device to receive performance requirements for applications and monitor applications executed on the computing device from the architectural information.

15. The controller node of claim 14, wherein the performance requirements for application comprises at least one of throughput or latency.

16. The controller node of claim 14, wherein the flow information is associated with a network packet and identifies target hardware of the computing device to process the network packet based on an application executed by the computing device.

17. The controller node of claim 16, wherein the flow information specifies a memory queue in the memory to receive the network packet.

18. One or more non-transitory, computer-readable storage media to optimize processing resources for a computing device over a software-defined networking (SDN) network, the computer-readable storage media comprising a plurality of instructions stored thereon that in response to being executed cause a computing device to:
    transmitting, by a resource notification and control module, computing device architectural information to a controller node coupled to the network, wherein the architectural information defines at least one of (i) hardware configuration or (ii) hardware resource utilization of the computing device;
    receiving, by a network adapter, a performance modification instruction in response to transmitting the architectural information;
    programming, by a local flow management module, a flow filter in the network adapter based on network flow information included in the received performance modification instruction; and
    modifying, by the resource notification and control module, a hardware operating parameter of the computing device based on the received performance modification instruction.

19. The one or more non-transitory, computer-readable storage media of claim 18, wherein transmitting the architecture information comprises transmitting data relating to at least one of a processor, a memory, a graphics processing unit (GPU), a hardware accelerator and the network adapter.

20. The one or more non-transitory, computer-readable storage media of claim 18, further comprising monitoring, by a monitoring engine module of the resource notification and control module, hardware operating parameters for inclusion in the architectural information of the computing device.

21. The one or more non-transitory, computer-readable storage media of claim 18, further comprising providing, by an application module of the resource notification and control module, performance requirements for applications and monitoring applications executed on the computing device for inclusion in the architectural information.

22. One or more non-transitory, computer-readable storage media to optimize processing resources for one or more computing devices over a software-defined networking (SDN) network using a controller node, the computer-readable storage media comprising a plurality of instructions stored thereon that in response to being executed cause one or more computing devices to:
    collecting, by a system resource module, computing device architectural information from each of the one or more computing devices, wherein the architectural information defines at least one of (i) hardware configuration or (ii) hardware resource utilization of each computing device;
    processing, by a monitoring engine module, the received architectural information to determine system parameters for each of the one or more computing devices;
    generating, by a decision engine module and based on the determined system parameters, one or more performance modification instructions for at least one of the one or more computing devices, the performance modification instructions comprising flow information to program a flow filter in a network adapter.

23. The one or more non-transitory, computer-readable storage media of claim 22, wherein determining system parameters comprises parameters relating to at least one of resource utilization, power usage, or performance.

24. The one or more non-transitory, computer-readable storage media of claim 22, wherein generating the performance modification instruction comprises generating data to modify a hardware operating parameter of the computing device.

* * * * *